United States Patent Office  3,072,719
Patented Jan. 8, 1963

3,072,719
3,4-DICHLOROPHENYL SUBSTITUTED
ALKYL UREAS
David J. Beaver, Richmond Heights, and Paul J. Stoffel,
St. Louis, Mo., assignors to Monsanto Chemical Company, St. Louis, Mo., a corporation of Delaware
No Drawing. Filed Apr. 23, 1959, Ser. No. 808,299
6 Claims. (Cl. 260—553)

This invention relates to a new class of chemical compounds and to a method of preparing the same. More particularly this invention relates to compounds of the structure

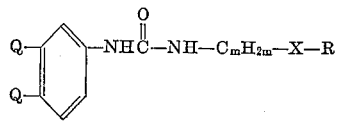

where Q is a halogen selected from the group consisting of chlorine and bromine, X is a member selected from the group consisting of sulfur and oxygen, $m$ is an integer from 1 to 3, and R is a member selected from the group consisting of phenyl, benzyl, alkyl radicals having from 1 to 6 carbon atoms, and cyclohexyl.

The new compounds of this invention are useful as bacteriostats and may be prepared by reacting 3,4-dihalophenylisocyanate with an amine of the structure

where X, $m$, and R have the same meaning as above. The reaction of the isocyanate with the amine takes place readily at room temperature and usually it is found desirable to use some diluent such as ether, benzene, or petroleum ether to reduce the exothermic reaction which takes place. The temperature of the reaction may vary considerably, e.g., from room temperature to the reflux temperature of the system depending upon the particular reactants and the solvent or diluent used.

As illustrative of the preparation of the new compounds of this invention are the following:

EXAMPLE I 1-(3,4-Dichlorophenyl)-3-(2-Methoxyethyl) Urea

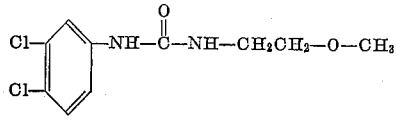

A solution of 18.8 g. (0.1 mole) of 3,4-dichlorophenylisocyanate in 50 ml. of heptane was added to 7.5 g. (0.1 mole) of methoxy-ethylamine in 50 ml. of heptane and mixed. A vigorous reaction sets in and the product separates as small white plates. Recrystallization from heptane-ethanol gives white plates of 1-(3,4-dichlorophenyl)-3-(2-methoxyethyl) urea having a melting point of 132.6–133.5° C. Yield—96.4% of theory. Analysis: calculated for Cl—26.93%; found—26.92%.

EXAMPLE II 1-(3,4-Dichlorophenyl)-3-(3-Benzyloxypropyl) Urea

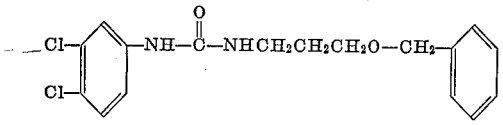

The procedure of Example I is repeated except the solvent is ether and the amine consists of 16.5 g. (0.1 mole) of 3-benzyloxypropylamine. Recrystallization from heptane gives fine white granules of 1-(3,4-dichlorophenyl)-3-(3-benzyloxypropyl) urea having a melting point of 165.5–166.6° C. Yield—85.1% of theory. Analysis: calculated for Cl—20.06%; found—19.80%.

EXAMPLE III 1-(3,4-Dichlorophenyl)-3-(3-Cyclohexyloxypropyl) Urea

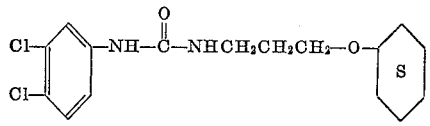

The procedure of Example I is repeated except the amine consists of 15.7 g. (0.1 mole) of 3-cyclohexyloxypropylamine reacted for about one hour to give fine white granules of 1-(3,4-dichlorophenyl)-3-(3-cyclohexylpropyl) urea having a melting point of 108.5–109.4° C. Yield—81.7% of theory. Analysis: calculated for Cl—20.59%; found—20.39%.

EXAMPLE IV 1-(3,4-Dichlorophenyl)-3-(3-Methoxypropyl) Urea

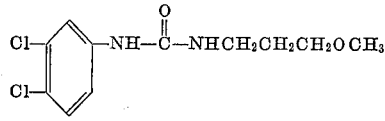

The procedure of Example I is repeated except the amine consists of 8.9 g. (0.1 mole) of 3-methoxypropylamine and fine white granules of 1-(3,4-dichlorophenyl)-3-(3-methoxpropyl) urea are obtained having a melting point of 108.5–109.1° C.

EXAMPLE V 1-(3,4-Dibromophenyl)-3-(2-Methoxyethyl) Urea

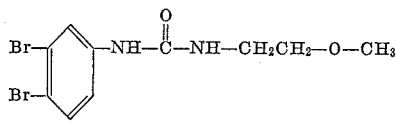

The procedure of Example I is repeated except that 27.7 g. (0.1 mole) of 3,4-dibromophenylisocyanate is used in place of the 3,4-dichlorophenylisocyanate and 1-(3,4-dibromophenyl)-3-(2-methoxyethyl) urea is obtained in good yield.

EXAMPLE VI 1-(3,4-Dichlorophenyl)-3-(2-Ethylmercaptoethyl) Urea

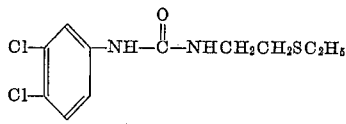

The procedure of Example I is repeated except the amine consists of 10.5 g. (0.1 mole) of 2-ethylmercaptoethylamine and white granules of 1-(3,4-dichlorophenyl)-3-(ethylmercaptoethyl) urea are obtained. Yield—89.1% of theory.

EXAMPLE VII 1-(3,4-Dichlorophenyl)-3-(hexyloxymethyl) urea

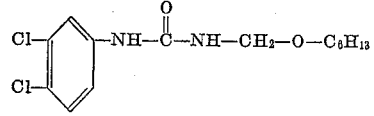

The procedure of Example I is repeated except the amine consists of 12.9 g. (0.1 mole) of hexyloxymethylamine whereby white granules of 1-(3,4-dichlorophenyl)-3-(hexyloxymethyl) urea are obtained in good yield.

EXAMPLE VIII

1-(3,4-Dichlorophenyl)-3-(3-Hexylmercaptopropyl) Urea

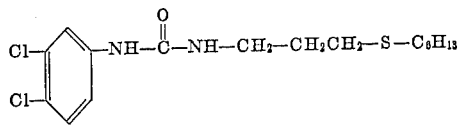

The procedure of Example I is repeated except the amine consists of 17.3 g. (0.1 mole) of 3-hexylmercaptopropylamine whereby white granules of 1-(3,4-dichlorophenyl)-3-(hexylmercaptopropyl) urea are obtained in good yield.

Although the new compounds of this invention include 1-(3,4-dichlorophenyl) ureas having either a thioether or an ether substituent on the terminal nitrogen atom, the alkyl ethers are preferred. Illustrative of these preferred compounds are those shown in Examples I, IV, V and VII.

It is to be understood that the foregoing examples are merely representative and additional compounds are contemplated by this invention including:

1-(3,4-dichlorophenyl)-3-(2-benzylmercaptoethyl) urea,
1-(3,4-dibromophenyl)-3-(2-methoxyethyl) urea,
1-(3,4-dichlorophenyl)-3-(amyloxymethyl) urea,
1-(3,4-dibromophenyl)-3-(3-benzyloxypropyl) urea,
1 - (3,4 - dichlorophenyl) - 3 - (3 - cyclohexylmercaptopropyl) urea,
1-(3,4-dibromophenyl)-3-(3-methoxypropyl) urea,
1-(3,4-dichlorophenyl)-3-(2-butylmercaptoethyl) urea,
1-(3,4-dibromophenyl)-3-(2-cyclohexyloxypropyl) urea,
1-(3,4-dichlorophenyl)-3-(3-butoxypropyl) urea,
1-(3,4-dichlorophenyl)-3-(2-phenylmercaptoethyl) urea,
1-(3,4-dichlorophenyl)-3-(3-phenoxypropyl) urea,
1-(3,4-dichlorophenyl)-3-(propylmercaptomethyl) urea,
1-(3,4-dichlorophenyl)-3-(phenylmercaptomethyl) urea,
and the like.

The compounds of this invention having the general formula given above have been found to have excellent bacteriostatic or antiseptic properties in cleansing compositions. By cleansing compounds are meant soaps or detergents and mixtures thereof. The term "soap" is employed in its popular meaning and refers to cleansing agents usually made by the action of an alkali or fat or fatty acids, e.g., the sodium or potassium salts of either saturated or unsaturated fatty acids. By way of example, each of the compounds described in Examples I and III above were separately incorporated in a neutral high grade white soap (a mixture of 80 percent sodium soap and 20 percent potassium soap produced from a 70 percent tallow and 30 percent oil glyceride blend in accordance with U.S. Patent 2,295,594), in a weight ratio of two parts to 100 parts by weight soap. Aliquots of each were added to a Saboraud's dextrose agar medium so as to give concentrations of the compounds in the agar as set forth in Table I below. The agar in each case was then poured into a petri dish, allowed to harden, and then inoculated with a standard culture of the bacterium *Micrococcus pyogenes* var. *aureus* of standard resistance. The incubation in each instance was made simultaneously at 37° C. for 48 hours. The extent of growth is noted below:

TABLE I

| Compound | Concentration, one part per— | | | | |
|---|---|---|---|---|---|
| | 1T | 10T | 100T | 1M | 10M |
| 1-(3,4-dichlorophenyl)-3-(2-methoxyethyl) urea | − | − | − | − | + |
| 1-(3,4-dichlorophenyl)-3-(cyclohexyloxypropyl) urea | − | − | − | − | + |

Legend: T=thousand; M=million; − =no growth; + =growth.

The bacteriostatically active compounds of this invention may be also used with other soaps and also the so-called anionic and non-anionic detergents. Alkali metal soaps of higher fatty acids of animal or vegetable origin which may be used include stearic, lauric, palmitic, oleic, linoleic, ricinoleic, and the like, including mixtures thereof obtained from tallow, lard, coconut oil, palm oil, castor oil, olive oil, hydrogenated fish and cottonseed oils and the like.

The organic anionic detergents of this invention include the well known surface active alkali metal sulfonates and sulfates.

Representative of these are the long chain alkyl aryl sulfonates, i.e. those wherein the alkali radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl, radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodiumdodecyl benzene sulfonate, sodium lauryl benzene sulfonate and sodium hexadecyl benzene sulfonate. Further descriptive information regarding these compounds may be found in U.S. Patent 2,264,737.

Other sulfonate surface-active agents are contemplated also, e.g. the long chain alkyl sulfonates such as sodium hexadecane sulfonate and sodium octadecane sulfonate.

The well known sulfate detergents having 12 to 26 carbon atoms and particularly those having an alkyl radical of about 8 to 22 carbon atoms may be employed as anionic detergent bases in accordance with this invention. Such detergents include the sulfuric acid esters of polyhydric alcohols incompletely esterified with fatty acids, e.g. sodium coconut oil monoglyceride mono-sulfate, sodium tallow diglyceride mono-sulfate, the pure and mixed higher alkyl sulfates such as sodium lauryl sulfate and sodium cetyl sulfate.

Additional anionic surface active sulfonates and sulfates contemplated by this invention are the sulfated and sulfonated alkyl acid amides such as Igepon T

the sulfated and sulfonated esters such as Igepon AP (RCOOCH₂SO₃Na) where R is an alkyl radical containing from 12 to 18 carbon atoms), sodium salt of the bisulfate of a dialkyl dicarboxylate, sodium salt of the sulfonic acid derivative of a dialkyl dicarboxylate, sodium sulfosuccinic esters such as

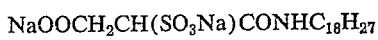

and the like.

In addition to the organic anionic detergents, the non-ionic surface active agents containing the bacteriostatic 3,4-dichlorophenyl substituted alkyl ureas of this invention provide effective antiseptic cleansing compositions. The non-ionic surface active agents contemplated are viscous liquid to wax-like water-soluble surface-active substance containing a polyglycol ether group of the structure

wherein $R_1$ and $R_2$ are hydrogen or short chain alkyl, where $n$ is an integer greater than 3, and where R is a residue of a compound of a monomeric organic compound having an active hydrogen, e.g. alcohols, phenols, amides, primary amines, secondary amines, carboxylic acids, etc. These non-ionic detergents are well known (note U.S. 1,970,578 and U.S. 2,213,477) and may be typified by the polyalkylene oxide derivatives (i.e. polyethylene oxide, polypropylene oxide, polybutylene oxide)

of water-insoluble higher fatty acids, such as lauric, oleic, palmitic, and stearic acid and the like or mixtures thereof, such as the mixtures of fatty acids, obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, tri-isopropyl-, nonyl-, dodecyl-, octadecyl-, phenols or naphthols, or higher alkyl alcohols, such as benzyl alcohol, cinnamyl alcohol. They may also be illustrated by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide (see U.S. 2,550,691).

Relatively small amounts of the bacteriostatic compounds of this invention may be employed in soaps, nonionic detergent compositions, and ionic detergent compositions or mixtures thereof and yet produce effective antiseptic compositions. Accordingly the compounds of this invention may be used in amounts as low as 0.1% to 1% by weight based upon the total weight of the soap or detergent employed, but the preferred range is on the order of 1% to 3% of the soap or detergent. For certain purposes 10% and even 50% by weight of the bacteriostatic compounds of this invention may prove desirable with only practical considerations determining the upper limit which may be used. Various colors of antioxidants, perfumes, water-softeners, salts such as silicates, chlorides, carbonates, phosphates and sulfates of alkali metals and the like builders, sodium carboxy methyl cellulose, the low molecular weight alcohols such as methanol, ethanol, isopropanol, ethylene glycol, and the like, may be included where desirable.

While this invention has been described with respect to certain embodiments, it is not so limited and it is to be understood that variations and modifications thereof obvious to those skilled in the art may be made without departing from the spirit or scope of this invention.

What is claimed is:
1. A compound of the formula

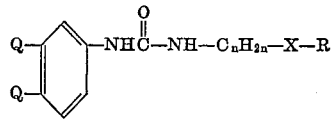

where Q is a halogen selected from the group consisting of chlorine and bromine, X is a member selected from the group consisting of sulfur and oxygen, $n$ is an integer from 1 to 3, and R is a member selected from the group consisting of phenyl, benzyl, cyclohexyl, and alkyl having from 1 to 6 carbon atoms.

2. A compound of the formula

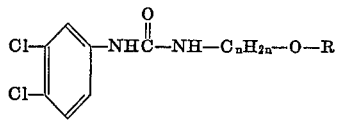

where $n$ is an integer from 1 to 3, and R is alkyl having from 1 to 6 carbon atoms.

3. A compound of the formula

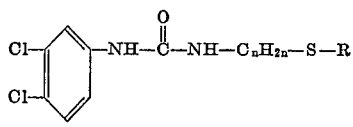

where $n$ and R have the same meaning as in claim 2.

4. 1-(3,4-dichlorophenyl)-3-(2-methoxyethyl) urea.
5. 1-(3,4-dichlorophenyl)-3-(3-benzyloxypropyl) urea.
6. 1-(3,4-dichlorophenyl)-3-(3 - cyclohexyloxypropyl) urea.

References Cited in the file of this patent
UNITED STATES PATENTS
2,870,205    Beaver et al. _____ Jan. 20, 1959

OTHER REFERENCES
Zigeuner et al.: Monatsheft, vol. 85, pages 1196–1207 (1954).
Beaver et al.: J. Am. Chem. Soc., vol. 79, pages 1236–1245 (1957).